April 22, 1930.  F. S. CARR  1,755,590
NUT AND SCREW FASTENING
Filed July 22, 1925
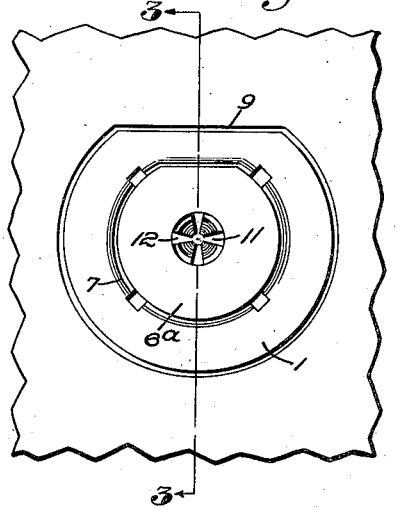
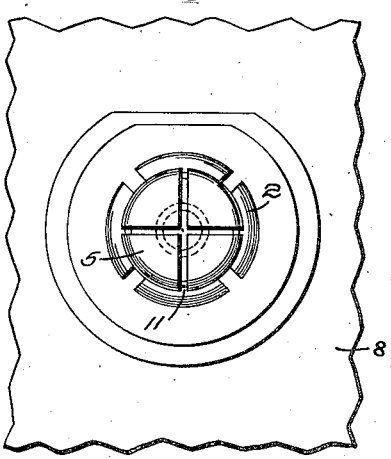
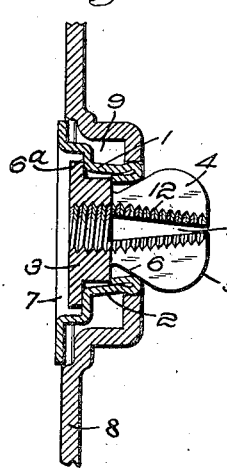
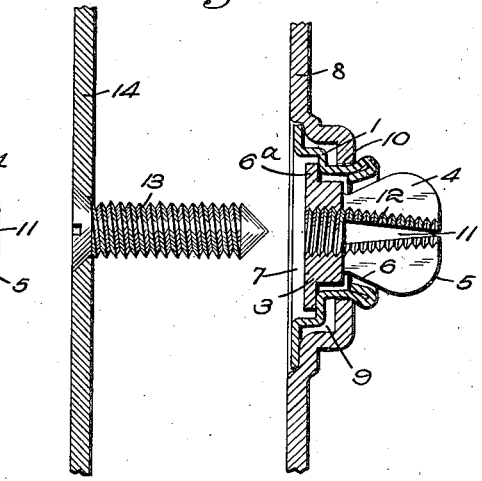
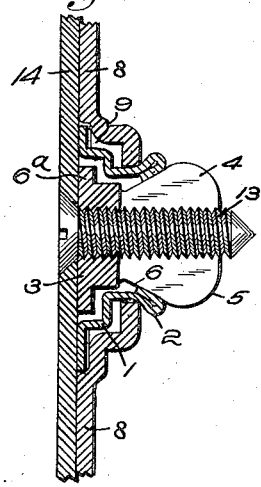
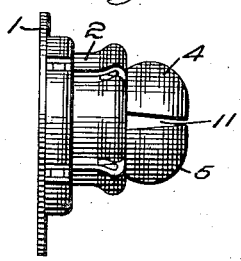
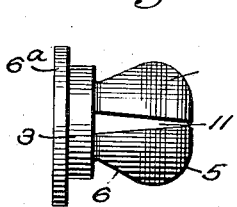
Inventor:
Fred S. Carr,
by Emery, Booth, Janney & Varney
Attys.

Patented Apr. 22, 1930

1,755,590

UNITED STATES PATENT OFFICE

FRED S. CARR, OF NEWTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

NUT AND SCREW FASTENING

Application filed July 22, 1925. Serial No. 45,274.

This invention aims to provide an improved nut and screw fastening device.

In the drawings, which illustrate a preferred embodiment of my invention:—

Figure 1 is an outside elevation of the nut device as it appears when secured to a support;

Fig. 2 is a view of the nut device and support as it appears from the inside of the support;

Fig. 3 is a section on the line 3—3 of Fig. 1, showing the nut device being engaged with the support;

Fig. 4 is a section showing the nut device secured to the support and showing the screw of the device and part to be attached, before securing the parts together;

Fig. 5 is a section showing the parts, shown in Fig. 4, secured together;

Fig. 6 is a side elevation of the nut unit; and

Fig. 7 is a side elevation of the nut.

Referring to the drawings, I have illustrated a nut and screw fastening device which is particularly, though not exclusively, useful for securing sheet metal parts together and for securing fixtures such as locks, hinges, etc., to metal parts of automobile bodies. The nut unit is carried by the body and the screw passes through the part to be secured to the body as best illustrated in Fig. 4.

The nut unit includes a nut holder casing 1 formed from a single piece of metal, which presents a plurality of resilient fingers 2 and a nut 3 assembled with the holder and presenting a plurality of expansible portions 4. The expansible portions 4 form a head portion 5 and a tapered neck portion 6, the head being of a relatively larger diameter than the opening between the resilient fingers 2 so that the nut may be assembled with the holder by simply snapping the head 5 of the nut 3 between the fingers 2, as illustrated in Fig. 4.

The nut 3 also has a base portion 6ª, which fits into a recess 7 provided by the holder casing 1 and both the base 6ª and recess 7 are provided with cooperating flat sides to prevent substantial turning movement of the nut 3 relative to the holder 1.

The sheet metal support 8 is initially prepared for reception of the nut unit by forming a depressed area 9 therein having an aperture 10 through the bottom thereof, as illustrated in Figs. 3, 4 and 5. The nut unit may be secured to the support 8 by pressing the holder 1 through the aperture 10 from the front side of the support, as shown in Fig. 3. During this engaging operation, the fingers 2 of the holder contract and snap through the aperture 10 and then expand to hold resiliently the nut unit in position relative to the support 8, as shown in Fig. 4. After the unit has been secured to the support 8, the nuts fit loosely enough in the holder so that it may be shifted to a limited extent either transversely or lengthwise relative to the holder for purposes more fully hereinafter described.

The nut 3 is initially formed with a threaded hole extending through the axis thereof, but during manufacture the head 5 and neck 6 are provided with slots 11 so that the head 5 may be "bumped" to form a tapered threaded hole 12 (Figs. 3 and 4) extending throughout the length of the head and neck. Thus, when the screw 13 is entered in the threaded hole 12 of the nut 3 to secure the part 14 against the support 8, the expansible portions 4 of the nut are expanded. As the nut expands, the neck contacts with the resilient fingers 2 of the holder 1, and upon continued rotation of the screw 13 the nut will be drawn toward the part 14 so that the tapered neck of the nut may expand the fingers 2 beyond their normal point of expansion, as shown in Fig. 5. Thus the fingers are gripped tightly between the wall surrounding the aperture 10 in the support 8 and the nut 3 and cannot contract to permit release of the nut unit while the screw remains threaded into the tapered hole 12 in the nut.

During the screwing together operation the unit may be held against turning movement relative to the support 8 by the interengaging straight sides of the base of the holder and the recess in the support 8, as shown in Fig. 1.

If the hole in the nut happens to be somewhat out of alignment with the screw when it is first entered into the hole 10, the transverse shiftability of the nut relative to the holder, previously referred to, will permit the nut to automatically align itself as the screwing together operation takes place.

While I have shown and described a preferred embodiment of my invention, it will be understood that changes involving omission, substitution, alteration and reversal of parts, and even changes in the mode of operation, may be made without departing from the scope of my invention, which is best described in the following claims.

Claims:

1. A fastening device for attachment to a relatively thin support comprising, in combination, a nut unit including a nut-holder casing having a flanged base portion to prevent passage of the nut-holder casing through an aperture in the relatively thin support and a resilient portion, a nut assembled with said casing, said nut presenting a flanged base portion located adjacent to the flanged base portion of the casing and an expansible portion passing through the resilient portion of the casing, and a screw for engagement with said nut to expand the expansible portion of said nut against the resilient portion of said casing, thereby to prevent contraction of said casing.

2. An expansible nut-fastening device for attachment to a relatively thin support and including a casing presenting a plurality of contractible and expansible fingers adapted to be snapped through an aperture in the support and a nut assembled with said casing for receiving a screw, said casing and nut being assembled prior to the nut being engaged by the screw, and means permitting free transverse shifting of said nut relative to said casing for the purpose of alignment with a cooperating screw and said nut presenting a plurality of expansible portions adapted to be expanded by the screw to back-support said fingers and prevent contraction thereof, thereby locking said device to the support.

3. An expansible nut-fastening device including a casing part presenting an annular contractible and expansible portion extending from a base flange for engagement in an aperture in a support, a nut initially assembled within the casing part for receiving a screw, said nut having a resilient head, a neck portion extending from a base portion located within the casing through and beyond one end of the annular contractible and expansible portion of the casing and said nut and casing being held in assembled relation by means extending from the annular contractible and expansible portion of the casing into the neck provided on the nut.

In testimony whereof, I have signed my name to this specification.

FRED S. CARR.